United States Patent
Tanaka et al.

(10) Patent No.: US 7,530,117 B2
(45) Date of Patent: May 5, 2009

(54) METHOD AND APPARATUS FOR PREVENTING UNAUTHORIZED USE OF SOFTWARE

(75) Inventors: Mitsuharu Tanaka, Kanagawa (JP); Kikuo Naito, Kanagawa (JP); Tsutomu Inose, Kanagawa (JP); Kazuhiro Kasai, Kanagawa (JP); Daisuke Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/862,346

(22) Filed: Jun. 8, 2004

(65) Prior Publication Data

US 2004/0254888 A1 Dec. 16, 2004

(30) Foreign Application Priority Data

Jun. 11, 2003 (JP) ............................. 2003-166693

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)
*H04N 7/16* (2006.01)
*G06F 7/58* (2006.01)
*G06F 15/16* (2006.01)
*G06K 19/00* (2006.01)

(52) U.S. Cl. .................... 726/31; 726/4; 726/5; 726/6; 726/7; 726/32

(58) Field of Classification Search ................ 726/4–7, 726/31–32

See application file for complete search history.

(56) References Cited

U.S. PATENT DOCUMENTS

| 5,260,999 | A |   | 11/1993 | Wyman |
| 5,421,009 | A | * | 5/1995  | Platt ........................... 709/221 |
| 5,671,412 | A |   | 9/1997  | Christiano |
| 5,758,069 | A |   | 5/1998  | Olsen ..................... 395/187.01 |
| 6,073,123 | A | * | 6/2000  | Staley ........................ 705/58 |
| 6,189,146 | B1 |  | 2/2001  | Misra et al. .................. 717/11 |
| 6,502,124 | B1 |  | 12/2002 | Shimakawa et al. ......... 709/203 |

(Continued)

FOREIGN PATENT DOCUMENTS

CN 1319800 10/2001

(Continued)

OTHER PUBLICATIONS

U.S. Appl. No. 10/862,349, filed Jun. 8, 2004.

*Primary Examiner*—Kambiz Zand
*Assistant Examiner*—Benjamin A Kaplan
(74) *Attorney, Agent, or Firm*—Fitzpatrick, Cella, Harper & Scinto (57) ABSTRACT

A server transmits, to clients, display data for displaying a plurality of input areas for pieces of identification information which identify apparatuses in which software is to be installed. The server receives the plurality of pieces of identification information input to the input areas. The server then issues, to the clients, license information for permitting installation of the software to the apparatuses corresponding to the pieces of received identification information. This makes it possible to efficiently issue license information of software.

21 Claims, 9 Drawing Sheets

U.S. PATENT DOCUMENTS

| | | | |
|---|---|---|---|
| 6,948,168 B1 | 9/2005 | Kuprionas | 717/178 |
| 7,013,294 B1 * | 3/2006 | Sekigawa et al. | 705/59 |
| 7,096,203 B2 * | 8/2006 | Pence et al. | 705/59 |
| 7,103,663 B2 | 9/2006 | Inoue | |
| 7,114,070 B1 * | 9/2006 | Willming et al. | 713/156 |
| 7,159,240 B2 * | 1/2007 | England et al. | 726/6 |
| 7,203,966 B2 * | 4/2007 | Abburi et al. | 726/29 |
| 7,222,106 B2 * | 5/2007 | Block et al. | 705/59 |
| 2001/0013024 A1 | 8/2001 | Takahashi et al. | 705/59 |
| 2001/0037403 A1 | 11/2001 | Mougi | |
| 2002/0026576 A1 * | 2/2002 | Das-Purkayastha et al. | 713/156 |
| 2002/0107809 A1 | 8/2002 | Biddle | |
| 2002/0152393 A1 | 10/2002 | Thoma | |
| 2002/0194578 A1 | 12/2002 | Irie | |
| 2003/0028786 A1 | 2/2003 | Mustafa | 713/189 |
| 2003/0028805 A1 * | 2/2003 | Lahteenmaki | 713/201 |
| 2003/0036976 A1 | 2/2003 | De Ruwe | |
| 2003/0220883 A1 * | 11/2003 | Block et al. | 705/59 |
| 2004/0019807 A1 * | 1/2004 | Freund | 713/201 |
| 2004/0039916 A1 | 2/2004 | Aldis | |
| 2004/0044901 A1 * | 3/2004 | Serkowski et al. | 713/200 |
| 2004/0117662 A1 * | 6/2004 | Ong | 713/202 |

FOREIGN PATENT DOCUMENTS

| | | |
|---|---|---|
| WO | WO 00/42555 | 7/2000 |
| WO | WO 00/75760 | 12/2000 |

* cited by examiner

Application Management Service

LICENSE INFORMATION FILE FOR INSTALLATION OF APPLICATION WILL BE ISSUED.
PLEASE INPUT LICENSE ACCESS NUMBER (LA#) WRITTEN IN PURCHASED PACKAGE.

LA# : ______________ 302

[Submit] 303

APPLICATION  ISSUANCE OF LICENSE INFORMATION FILE (PRODUCT INFORMATION)

| | PRODUCT NAME | Product1 | |
|---|---|---|---|
| | PRODUCT CODE | 1234-5678-ABCD | |
| LICENSE | TERM | 90 days | |
| | COUNTER | COUNTER 1 | 30 |
| | | COUNTER 2 | UNLIMITED |
| | COUNT | 5 | |

USER INFORMATION  UNREGISTERED
MAINTENANCE CONTRACT  UNREGISTERED
PLEASE INPUT DEVICE NUMBER OF APPARATUS AS INSTALLATION TARGET

DNO : ~403
       ~402

403~
404~ REFERENCE  405 CLICK HERE TO OBTAIN SAMPLE OF CSV FILE
(PLEASE DESIGNATE FILE TO USE CSV FILE ON WHICH DNO IS WRITTEN)

406
ISSUE

407
RETURN

408~ STOP (RETURN TO TOP)

METHOD AND APPARATUS FOR PREVENTING UNAUTHORIZED USE OF SOFTWARE

FIELD OF THE INVENTION

The present invention relates to a method and apparatus for preventing unauthorized use of software.

BACKGROUND OF THE INVENTION

There have been license information issuing systems for software to be installed in information processing apparatuses. Such a system prevents unauthorized use of software in an apparatus other than an installation target apparatus by issuing a license in return for information unique to the installation target apparatus.

The conventional license information issuing systems cannot, however, issue a plurality of licenses for a plurality of apparatuses at once. Therefore, for software containing a plurality of licenses which can be installed in a plurality of apparatuses, license issuing processing must be done for each apparatus, resulting in complex and time-consuming operation.

SUMMARY OF THE INVENTION

The present invention has been made to solve the above problem in the prior art.

The present invention can efficiently issue a software license.

According to the present invention, there is provided an information processing apparatus comprising transmission means for transmitting display data for displaying a plurality of input areas for a plurality of pieces of identification information which identify apparatuses in which software is to be installed, reception means for receiving the plurality of pieces of identification information input to the input areas, and license information issuing means for issuing license information for permitting installation of the software to the apparatuses corresponding to the plurality of pieces of identification information received by the reception means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A predetermined embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<Description of Apparatus>

Figure 1:
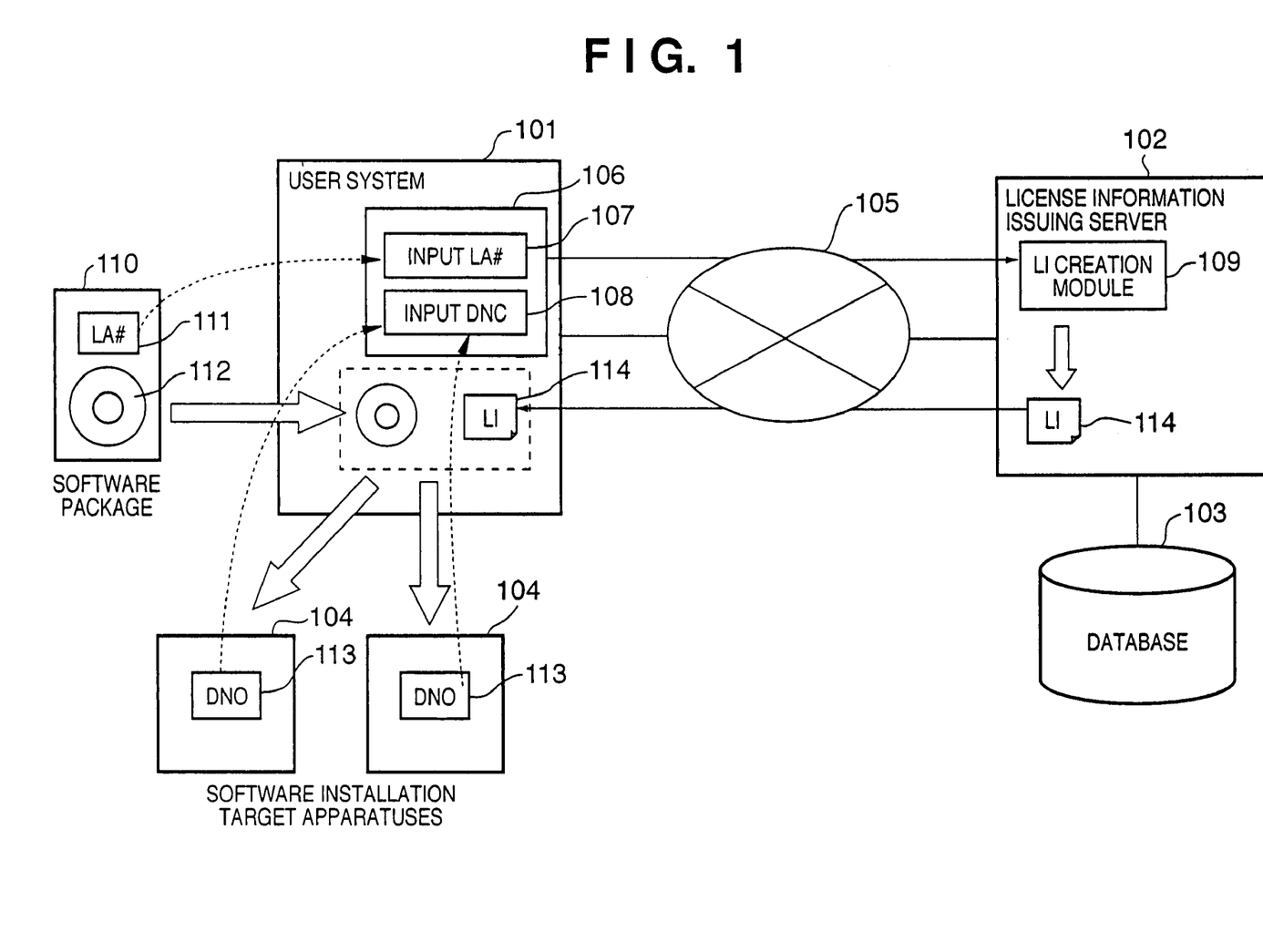
FIG. 1 is a view showing the arrangement of a license information issuing server according to an embodiment of the present invention.

FIG. 1 is a view showing the system arrangement of a license information issuing server according to a predetermined embodiment of the present invention. This system is designed to manage software, and more specifically, a software license information issuing system which receives a device number as identification information for uniquely identifying an installation target apparatus and issues license information for allowing software to be installed in the apparatus in order to prevent unauthorized use of the software. This embodiment uses the expression "device number". However, it is not limited to numerals. For example, this information may be a code including characters or symbols as long as it is identification information that uniquely identify an installation target apparatus.

Referring to FIG. 1, reference numeral 101 denotes a user system which is operated by a user in the embodiment of the present invention; 102, a license information issuing server; 103, a database which is connected to the license information issuing server 102 and stores software information and the license information of software; 104, at least one software installation target apparatus in which a user installs software by using the license information acquired from the license information issuing server 102; and 105, a network such as the Internet, through which the user system 101 is connected to the license information issuing server 102.

Reference numeral 106 denotes a window display unit on the user system, which displays all windows when the user uses the license information issuing server; 107, an input area for a license access number (to be abbreviated as LA#) displayed on a window; 108, an input area for a device number (to be abbreviated as DNO) displayed on the window; 109, a license information (to be abbreviated as LI) creation module which creates license information; 110, a software package which is purchased by the user and contains a license access number (LA#) 111 and software 112; 113, a device number (DNO) which can uniquely identify the software installation target apparatus 104; and 114, license information (LI) which is acquired when the user operates the license information issuing server 102 and is used to install the software 112 into the software installation target apparatus 104.

In order to install software managed by this system into an information processing apparatus managed by the user, the license information issued by the license information issuing server 102 is always required. The license information issuing server 102 issues license information in response to authorized access through the network 105. Identification information (DNO) unique to an apparatus in which software is to be installed can be embedded in the license information. Therefore, the software cannot be installed in an apparatus having no identification information contained in the license information by using the license information. That is, different license information is required to install the software in such an apparatus. This makes it possible to prevent unauthorized installation of the software.

Figure 2:
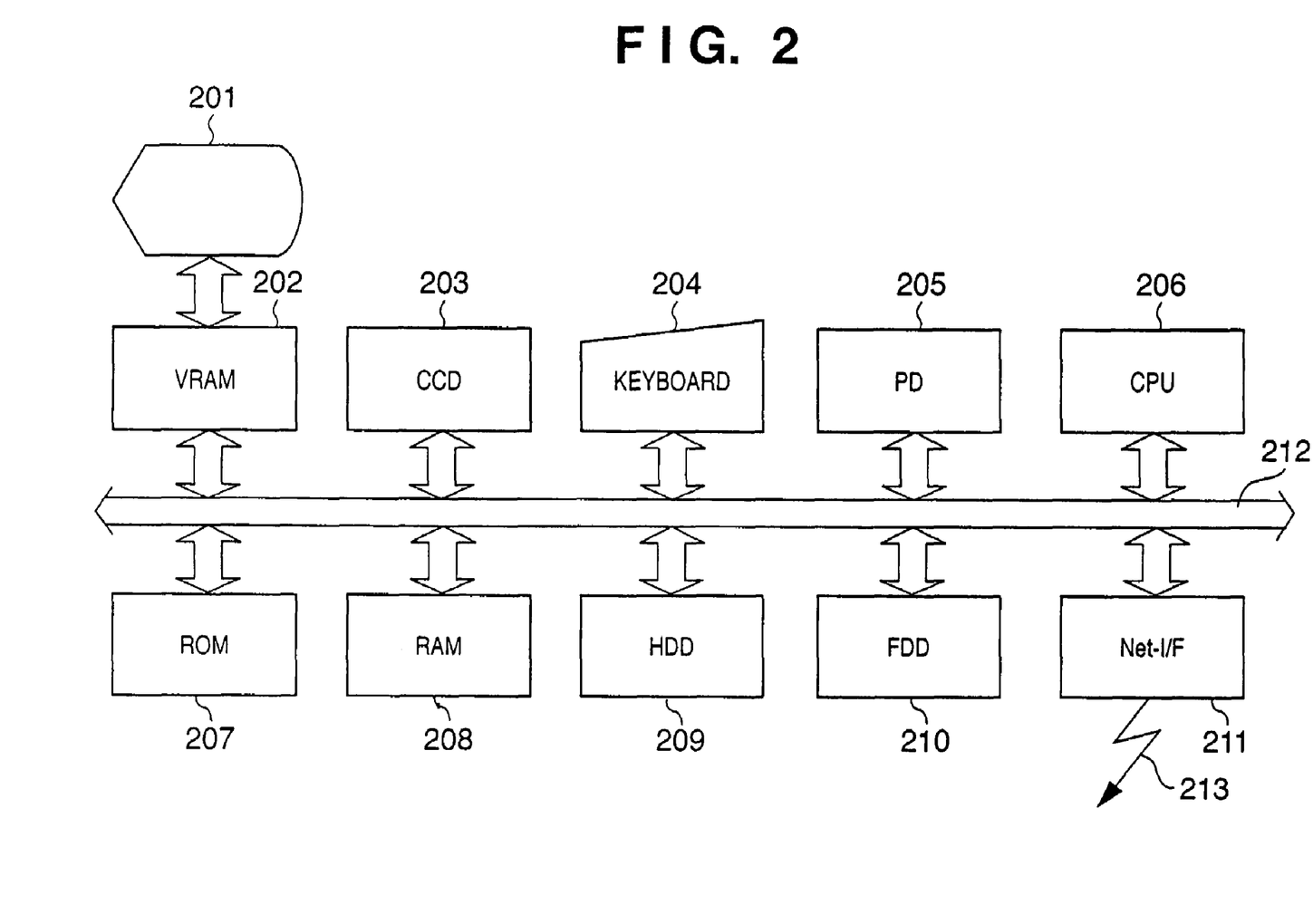
FIG. 2 is a block diagram of the license information issuing server according to the embodiment of the present invention.

FIG. 2 is a block diagram showing the schematic arrangement of the license information issuing server 101.

Referring to FIG. 2, reference numeral 201 denotes a display device having a display screen on which user interface information such as windows, icons, messages, and menus is displayed; and 202, a VRAM in which an image to be displayed on the display device 201 is drawn. The image data created in the VRAM 202 is transferred to the display device 201 in accordance with a predetermined format, thereby displaying the image on the display device 201. Reference numeral 203 denotes a CDD (Compact Disk Drive) which is a device for reading and writing various kinds of control programs and data from and to recording media such as a CD-ROM and CD-R. This device may be a DVD drive.

Reference numeral 204 denotes a keyboard having various kinds of keys for inputting characters; 205, a PD (Pointing Device) which is used to, for example, designate an icon, menu, or another object displayed on the display screen of the display device 201; 206, a CPU which controls each device connected to a CPU device on the basis of the control programs stored in a ROM 207, an HDD (Hard Disk Drive) 209, an FDD (Flexible Disk Drive) 210, and the CDD 203; 207, the ROM (Read Only Memory) which holds various kinds of control programs and data; and 208, a RAM (Random Access Memory) having the work area of the CPU 206, a save area for data at the time of error processing, a load area for a control program, and the like.

Reference numeral 209 denotes the HDD which stores various kinds of control programs and data; 211, a network interface (Net-I/F) which can communicate with another information processing apparatus, printer, or the like through a network 213; and 212, a CPU bus which includes an address bus, data bus, and control bus. Control programs can be provided from the ROM 207, HDD 209, FDD 210, and CDD 203 to the CPU 206, or can be provided from other information processing apparatuses through the network 213.

The hardware arrangement of the license information issuing server 101 has been described above with reference to FIG. 2. The user terminal 102, sales company terminal 103, and software developer terminal can adopt the same arrangement as that shown in FIG. 2.

The operation of the license information issuing server 102 according to this embodiment will be described with reference to FIGS. 3 to 6.

Figure 3:
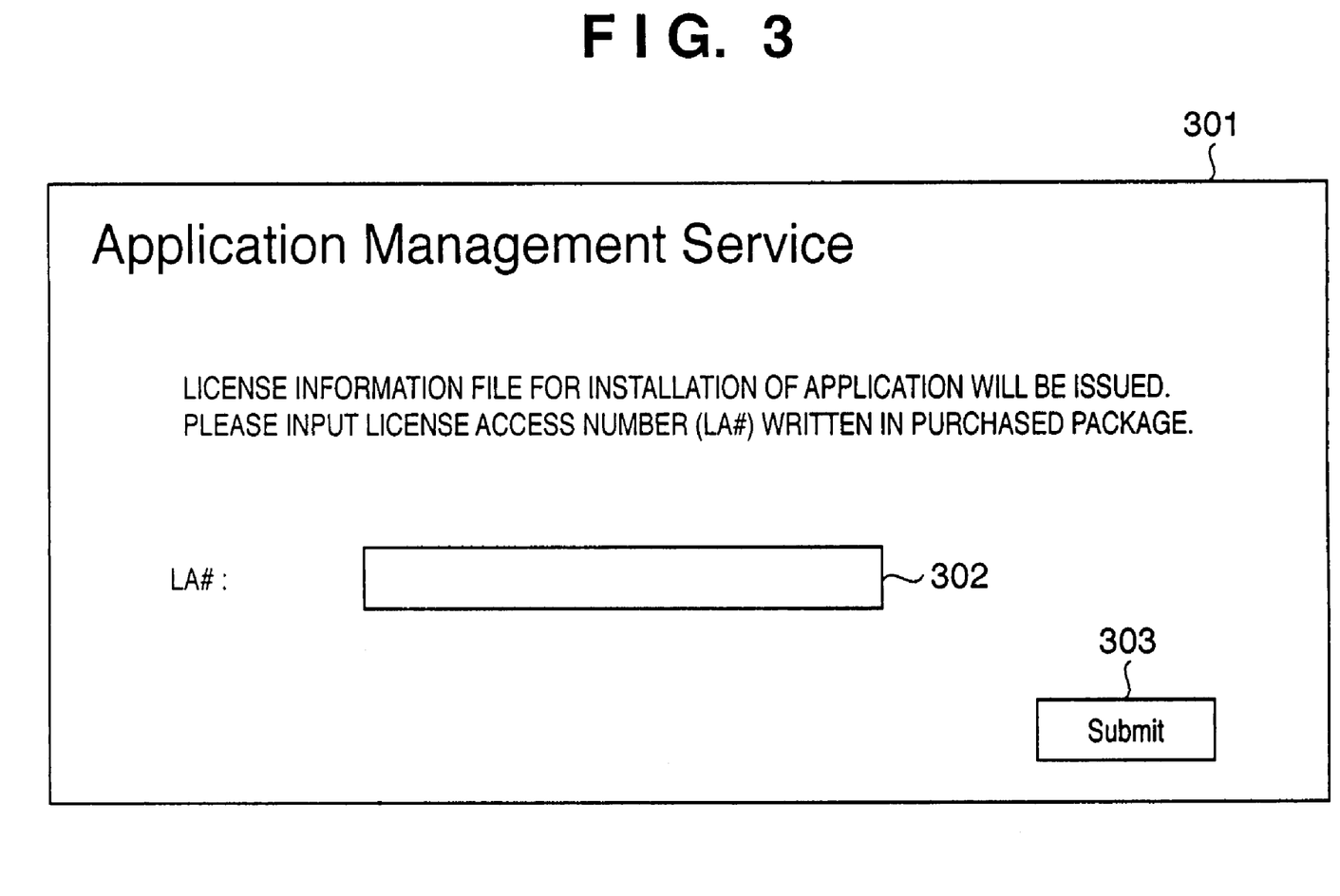
FIG. 3 is a view showing a license access number input window in the embodiment of the present invention.

FIG. 3 is a view showing a license access number input window provided by the license information issuing server 102. Upon reception of access from the user system 101 through the Internet 105, the license information issuing server 102 transmits display data for displaying the window shown in FIG. 3 to the window display unit 106.

Referring to FIG. 3, reference numeral 301 denotes a license access number input window, on which a license access number input box 302 and submit button 303 are displayed.

When license information is to be issued, the user displays this window. The user then inputs the license access number (LA#) written on a purchased software package in the input box 302, and presses the submit button 303. When the submit button 303 is pressed, the window shown in FIG. 4 is displayed on the window display unit 106 of the user system 101.

The user has already designated a license count of software and acquired a license access number (LA#) online or off line. The license information issuing server 102 is holding the license access number (LA#) and the license count in correspondence with each other.

Figure 4:
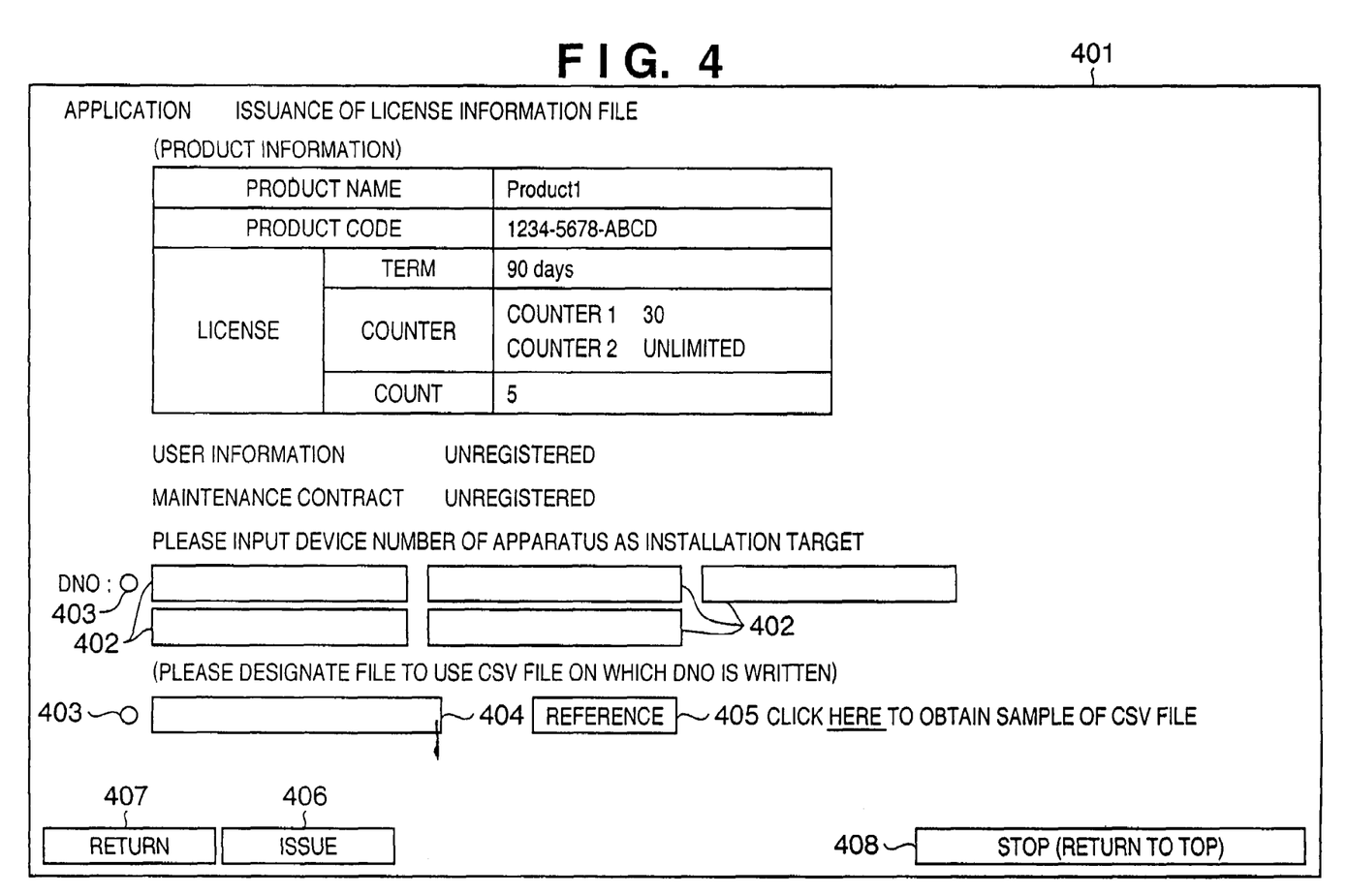
FIG. 4 is a view showing a license information issuing window in the embodiment of the present invention.

FIG. 4 is a view showing a license information issuing window provided by the license information issuing server 102. Upon reception of information indicating the selection of the submit button 303 in FIG. 3 in the user system 101, the license information issuing server 102 transmits display data for displaying the window shown in FIG. 4 to the window display unit 106 of the user system 101.

Referring to FIG. 4, reference numeral 401 denotes a license information issuing window (written as "issuance of license information file" in FIG. 4), on which the following are displayed together with software information (written as "product information" in FIG. 4): device number (DNO) input boxes 402, device number input method selection radio buttons 403, a device number file name input box 404, a device number file designation reference button 405, an "Issue" button 406 which gives an instruction to issue license information, a [Return] button 407 to return to the previous window, and a [Stop] button 408 which stops the license information issuing processing itself.

The device number input boxes 402 are displayed by a number corresponding to a smaller one of the value obtained by subtracting an issued license count from the software license count and the maximum number of device number input boxes that can be displayed.

The user confirms on this window that the displayed software information coincides with the purchased software. The user then selects a device number designation method with the button 403. If the user selects the upper radio button, the device number (DNO) of an apparatus in which the software is to be installed is input to the device number input box 402. If the user selects the lower radio button, he/she inputs a device number file into the device number file name input box 404 through an absolute path. Alternatively, the user selects the device number file designation reference button 405 to display a file designation dialog box as a standard for the operating system, and designates a device number file. After designating a device number by any one of these methods, the user selects the [Issue] button 406, thereby creating license information, in a predetermined place in the license information issuing server 102, which is required to install the software in the apparatus corresponding to the input device number. Upon completion of the creation of the license information, the license information issuing server 102 transmits display data for displaying the window shown in FIG. 5 to the user terminal 101.

Figure 5:
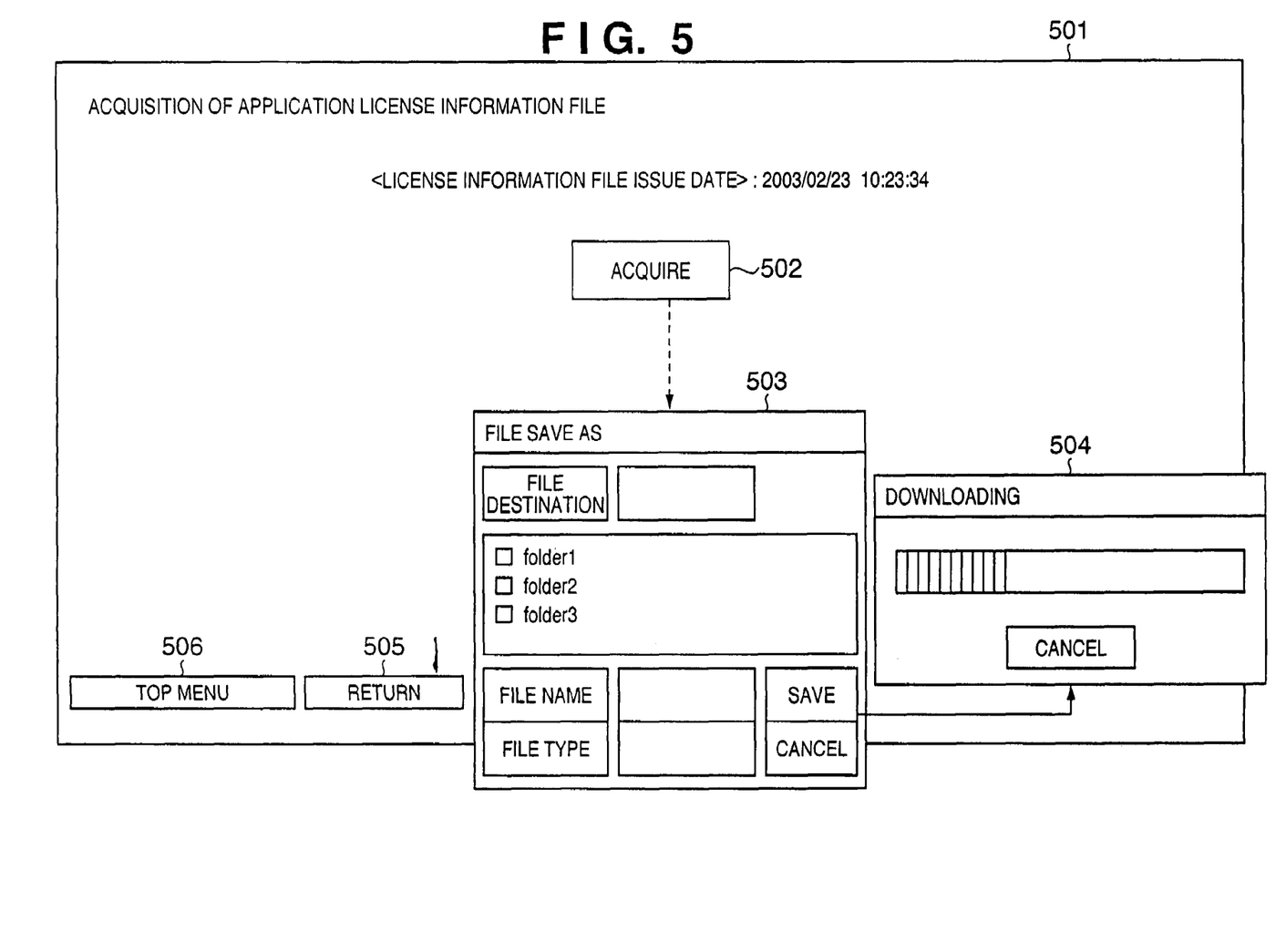
FIG. 5 is a view showing a license information acquiring window in the embodiment of the present invention.

FIG. 5 is a view showing a license information acquisition window provided by the license information issuing server 102.

Referring to FIG. 5, reference numeral 501 denotes a license information acquisition window (written as "license file acquisition" in FIG. 5), on which the following are displayed together with a license information issue date (written as "license file issue date" in FIG. 5): an [Acquire] button 502 which gives an instruction to acquire license information, a [Return] button 505 for returning to the previous window, and a [Top Menu] button 506 for returning to the Top Menu.

When the user presses the [Acquire] button 502 in this window to acquire previously issued license information (file), a file designation dialog box 503 as a standard for the operating system is displayed. When an arbitrary license information (file) storage destination and file name are input, and an instruction to store the information is given, a "downloading" dialog 504 as a standard for the operating system is displayed, thereby downloading the information.

Figure 6:
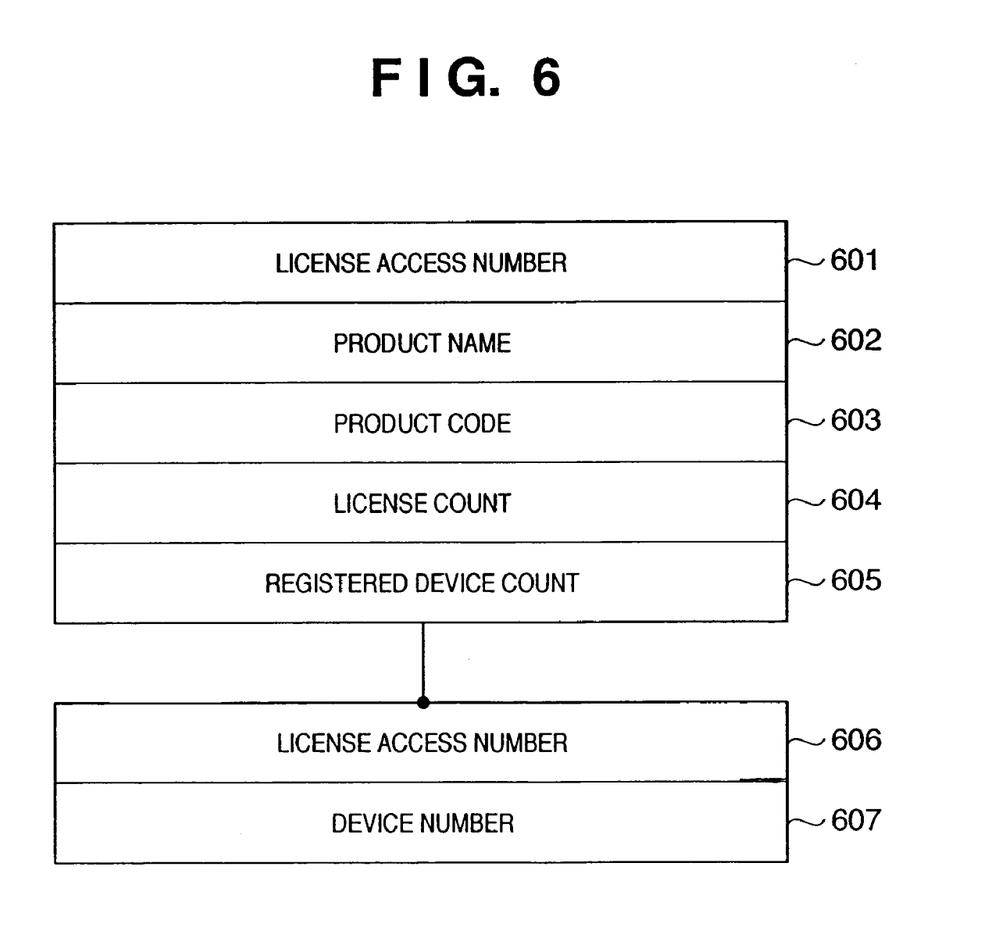
FIG. 6 is a view for explaining a software management database in the embodiment of the present invention.

FIG. 6 is a view simply showing information stored in the database 103.

Reference numeral 601 denotes a storage area for a license access number, in which the license access number 111 input to the license access number input area 107 is stored; 602, a product name of software corresponding to a license access number; 603, a product code; 604, a license count of software, which indicates that the software can be installed in apparatuses equal in number to the value of this count; and 605, a registered device count which is an area in which the total number of device numbers input when the license information of this software was issued in the past (issued license count) is stored.

In an area 606, the same license access number equal to that stored in the area 601 is stored. In an area 607, a device number input when license information has been issued in the past is stored. Tables including the areas 606 and 607 exist by the number of registered device numbers and are associated with the table including the areas 601 to 605 by the license access number.

A processing sequence in the license information issuing server 102 will be described next with reference to flowcharts.

Figure 7:
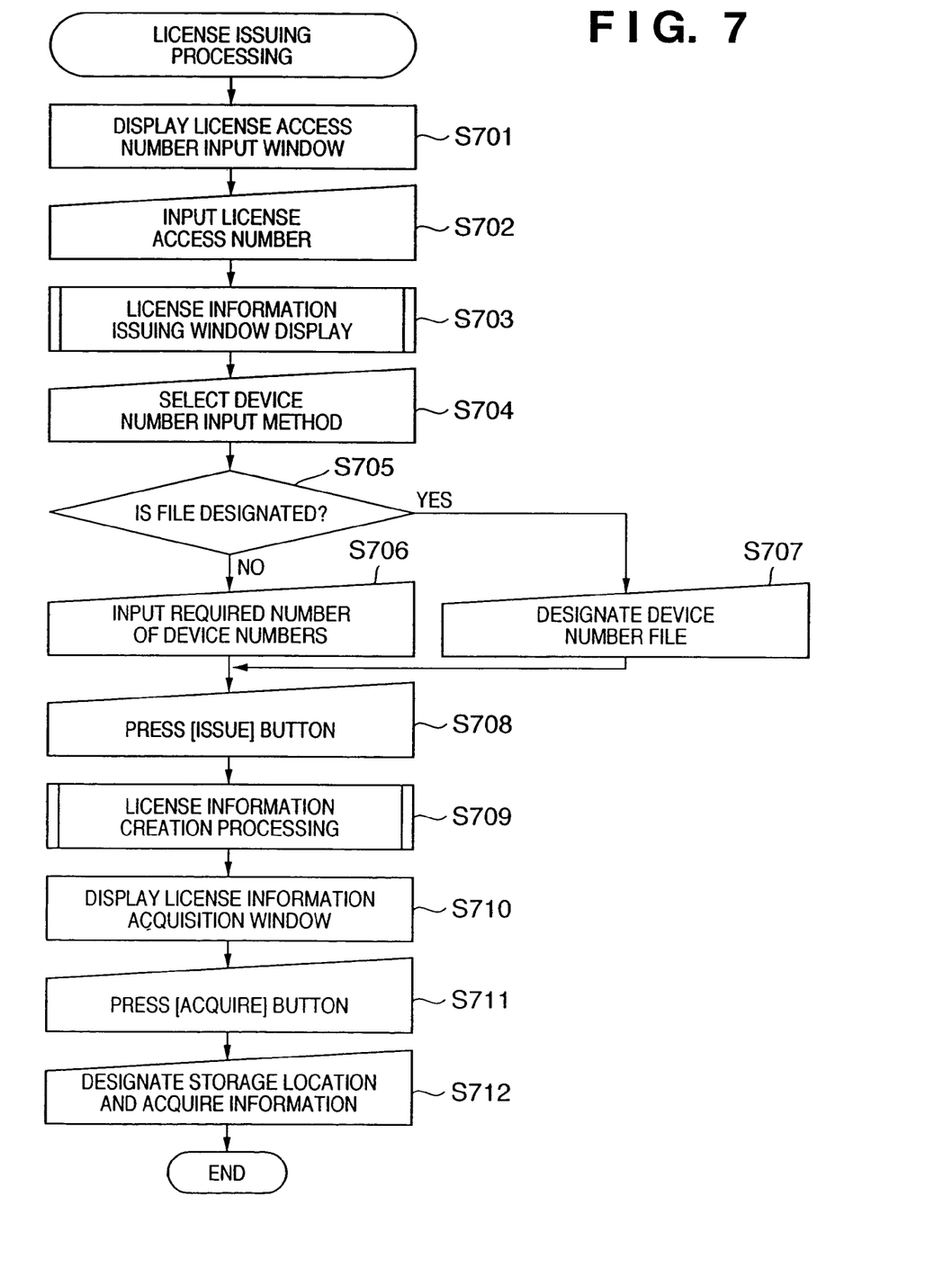
FIG. 7 is a flowchart for license issuing processing in the embodiment of the present invention.
Figure 8:
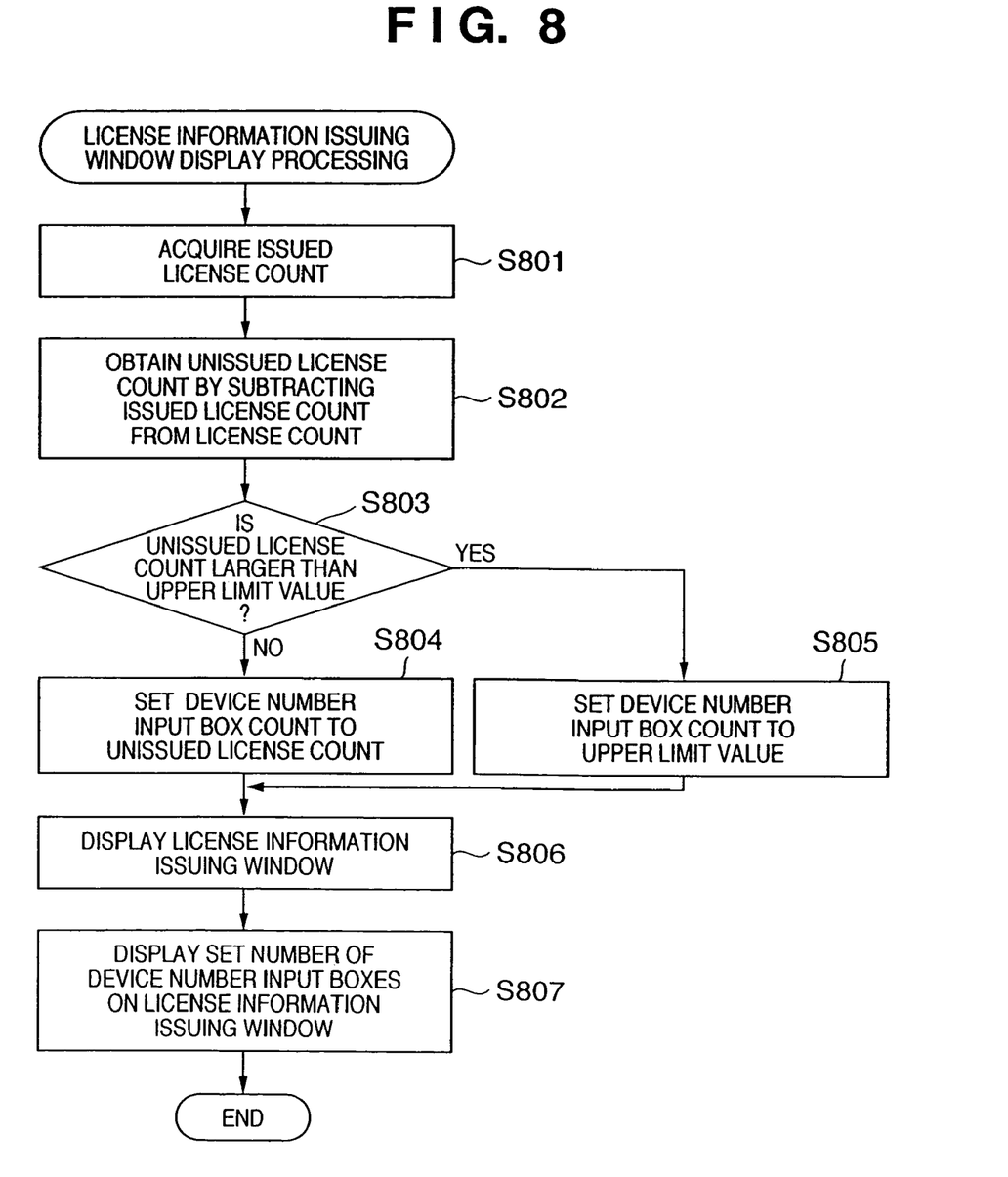
FIG. 8 is a flowchart for license issuing processing in the embodiment of the present invention.
Figure 9:
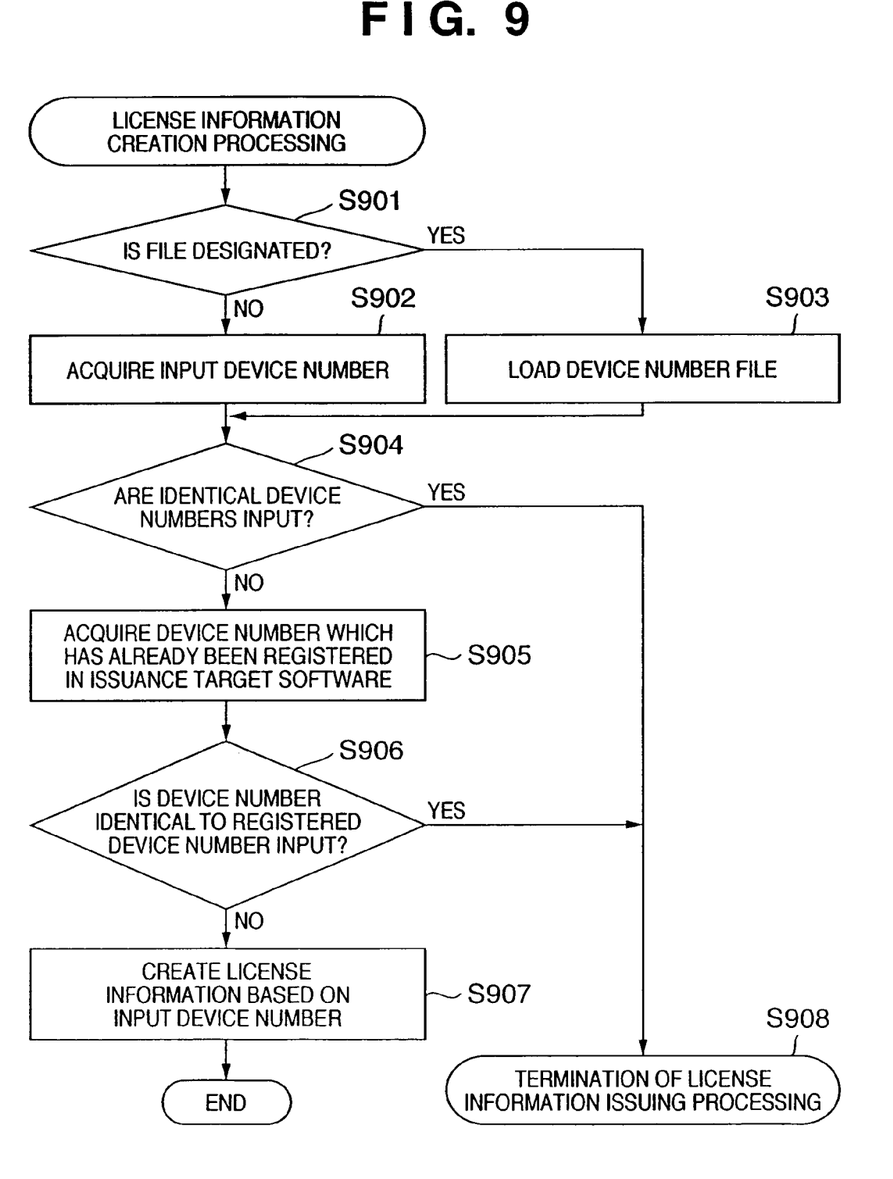
FIG. 9 is a flowchart for license issuing processing in the embodiment of the present invention.

FIGS. 7 to 9 are flowcharts for license information issuing processing in the license information issuing server 102.

The license information issuing server 102 starts the processing shown in FIG. 7 in accordance with access from the user system 101. In step S701, display data for a license access number input window (FIG. 3) is transmitted to the window display unit 106 of the user system 101 to be displayed. In step S702, input of a license access number by the user is accepted. When a license access number is input in the user system 101, the flow advances to step S703, in which the license information issuing server 102 transmits display data for a license information issuing window (FIG. 4) to the window display unit 106 of the user system 101 to display the window.

When the user selects a device number input method and selects to input device numbers one by one in the user system 101 in step S704, he/she inputs device numbers equal in number to apparatuses in which software is to be installed in step S706. When the user selects to designate device numbers with a device number file, he/she executes operation of designating a device number file in step S707. When the designation of device numbers is completed by any one of the methods, the user presses the "Issue" button 406 in step S708 to give an instruction to issue license information (file). Upon reception of the instruction to issue license information, the license information issuing server 102 performs license information creation processing in step S709.

When the creation of license information is completed, display data for a license information acquisition window (FIG. 5) is transmitted to the display unit 106 of the user system 101 in step S710 to display the window. When the user presses the [Acquire] button 502 in step S711 to acquire the created license information, a storage dialog 503 as a standard for the operating system is displayed in step S712. An arbitrary storage destination and file name are input, and the information is stored. The license information issuing processing is then terminated.

Display processing for a license information issuing window will be described next with reference to the flowchart of FIG. 8.

In the flowchart of FIG. 7, the flow is started as the processing in step S703, and an issued license count (the registered device count 605 in FIG. 6) is acquired in step S801. In step S802, an unissued license count is obtained by subtracting the issued license count 605 from the license count of this software (the license count 604 in FIG. 6). In step S803, it is checked whether the unissued license count is larger than a predetermined upper limit value. If the unissued license count is equal to or smaller than the upper limit value, the unissued license count is set to the number displayed in the device number input box in step S804, and the flow advances to step S806. If the unissued license count is larger than the upper limit value, the upper limit value is set to the number displayed in the device number input box in step S805. In step S806, the license information issuing window shown in FIG. 4 is displayed. In step S807, the device number input boxes 402 equal in number to the number set in step S804 or S805 are displayed on the license information issuing window, thus terminating the display processing for the license information issuing window.

Creation processing for license information in the license information issuing server 102 will be described next with reference to the flowchart of FIG. 9.

This flow is started as the processing in step S709 in FIG. 7. First of all, in step S901, it is checked whether the device number input method selected with the radio button 403 in FIG. 4 is file designation. If the device number input method is not file designation, the device number input to the device number input box 402 in the license information issuing window shown in FIG. 4 is acquired in step S902. The flow then advances to step S904. If the device number input method selected with the radio button 403 is file designation, the device number file input to the device number file name input box 404 is loaded in step S903.

It is then checked in step S904 whether there are identical device numbers among those input. If there are identical numbers, the flow advances to step S908 to stop the license information issuing processing. If there are no identical numbers, device numbers that have been registered with respect to this software are acquired (all device numbers 607 with which the license access numbers 606 in FIG. 6 coincide are acquired) in step 905.

In step S906, it is checked whether there is any input device number that coincides with any registered device number. If YES in step S906, since the same software is to be installed in the same apparatus, the flow advances to step S908 to stop the license information issuing processing. If NO in step S906, license information (file) based on each input device number is created in a predetermined area in step S907, thus terminating the license information creation processing.

Assume that it is determined in step S904 that identical device numbers are input. In this case, the redundant device numbers may be omitted, and the flow may advance to step S905, determining that device numbers equal in number to the types of input device numbers.

In addition, if it is determined in step S906 that a device number identical to a registered device number is input, the registered device number may be neglected, and the flow may advance to step S907, determining that only unregistered device numbers are input.

Furthermore, assume that the device number input boxes 402 equal in number to the predetermined upper limit value are displayed in the window shown in FIG. 4. Even in this case, if the number of licenses that can be issued exceeds the upper limit value, the designation of a device number file containing device numbers larger in number than the upper limit value of the displayed device number input boxes can be accepted.

Note that apparatuses in which software is to be installed are not limited to any form as long as the apparatuses are information processing apparatuses in which the software can be installed and executed. For example, such apparatuses include personal computers, portable terminals including cell phones, and image forming apparatuses.

In addition, a device number input file is not limited to any format as long as a plurality of device numbers can be described in the file. For example, such formats include a CSV format, tab-delimiting text format, and unique formats.

According to this embodiment, when license information of software identified by a license access number is to be issued, allowing input of a plurality of device numbers makes it possible to issue license information for a plurality of apparatuses at once. That is, license information of software can be efficiently issued.

An issued license count is stored, and an unissued license count is obtained to display device number input boxes equal in number to the unissued license count. This makes it possible to separately issue license information a plural number of times.

Limiting the number of device number input boxes that can be displayed within the upper limit value can prevent the window from becoming overcrowded due to a large number of device number input boxes, and allows the boxes to be displayed within one window.

License information can be issued for many apparatuses, without the labor of inputting many device numbers on the window, by describing device numbers in a file in a predetermined format and designating the file name.

If device number input boxes equal in number to a predetermined upper limit value are displayed, and the number of licenses that can be issued exceeds the upper limit value, device numbers exceeding the upper limit value can be simultaneously designated by designating device numbers with a device number file.

In addition, checking whether there are any identical device numbers among those input can prevent a license from being redundantly issued to the same apparatus.

Assume that it is checked whether there are any identical device numbers among those inputs, and it is determined that there are identical device numbers. In this case, issuing license information for valid device numbers while neglecting redundant inputs can prevent all inputs from being wasted.

Furthermore, checking whether each input device number coincides with any one of device numbers registered in the past can prevent double issuance of a license to the same apparatus, and can separately issue license information a plural number of times.

Assume that it is checked whether there is a device number that coincides with any one of device numbers registered in the past, and it is determined that there is such a number. In this case, license information can be issued to device numbers except for this device number.

Other Embodiment

Although an embodiment has been described in detail above, the present invention can be applied to a system constituted by a plurality of devices, or to an apparatus comprising a single device.

The present invention incorporates a case wherein programs of software for implementing the functions of the embodiment described above are directly or remotely supplied to a system or apparatus to cause the computer of the system or apparatus to read out and execute the programs, thereby implementing the functions. In this case, the form of the present invention need not be programs as long as it has the functions of the programs.

The program codes themselves which are installed in the computer to allow the computer to implement the functions/processing of the present invention also realize the present invention. That is, the computer programs themselves, which implement the functions/processing of the present invention, are also incorporated in the present invention.

In this case, each program may take any form, e.g., an object code, a program executed by an interpreter, and script data supplied to an OS, as long as it has the function of the program.

As a recording medium for supplying the programs, a floppy (registered trademark) disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of user to download program files for causing the computer to execute the functions/processing of the present invention.

In addition, the functions/processing of the present invention can be implemented by encrypting the programs of the present invention, storing the encrypted data in storage media such as CD-ROMs, distributing them to users, allowing users who satisfy a predetermined condition to download key information for decryption from a homepage through the Internet, executing the encrypted programs using the key information, and allowing a computer to install the programs.

The functions of the above embodiment are implemented not only when the readout programs are executed by the computer but also when the OS running on the computer performs part or all of actual processing on the basis of the instructions of the programs.

The functions of the above embodiment are also implemented when the programs read out from the storage medium are written in the memory of a function expansion board inserted into the computer or a function expansion unit connected to the computer, and the CPU of the function expansion board or function expansion unit performs part or all of actual processing on the basis of the instructions of the programs.

As many apparently widely different embodiments of the present invention can be made without departing from the spirit and scope thereof, it is to be understood that the invention is not limited to the specific embodiments thereof except as defined in the appended claims.

What is claimed is:

1. A license information issuing server for issuing license information to a user terminal for installing software in apparatuses that communicate with the user terminal, comprising:
a storage unit that stores, associated with license access information corresponding to a software, a license count number designating a limit of the number of apparatuses in which the software is permitted to be installed;
a first transmission unit that, upon receiving an access request via a network from the user terminal for license information, transmits to the user terminal first display data for displaying on a display unit of the user terminal a first input area for the user to input license access information of a software to be installed;
a first reception unit that receives license access information input by the user in the first input area;

a determination unit that, upon receiving from the user terminal license access information input by the user in the first input area, determines, based on the license count number designating the limit of the number of the apparatuses in which the software associated with the received license access information can be installed, a number of second input areas for a user to input identification information identifying each of the apparatuses in which the software is to be installed;

a second transmission unit that transmits, to the user terminal, second display data for displaying on the display unit of the user terminal the determined number of the second input areas for the user to input the identification information of the apparatuses in which the software is to be installed;

a second reception unit that receives from the user terminal a plurality of pieces of identification information of the apparatuses input by the user in the second input areas; and a license information issuing unit that issues license information to the user terminal for permitting installation of the software to each of the apparatuses corresponding to the plurality of pieces of identification information received by said second reception unit.

2. The apparatus according to claim 1, further comprising a derivation unit that derives, based on the license count number and additional information, a number of apparatuses which are currently permitted to install the software, wherein said second transmission unit transmits the second display data for displaying the second input areas equal in number to the number derived by said derivation unit.

3. The apparatus according to claim 2, further comprising a second storage unit that stores, as the additional information, a number of registered apparatuses which have already been permitted to install the software, wherein said derivation unit derives the number of apparatuses which are currently permitted to install the software by subtracting the number of registered apparatuses from the license count number 4. The apparatus according to claim 1, wherein the number of second input areas displayed by using the second display data transmitted by said second transmission unit is not more than the license count number.

5. The apparatus according to claim 1, further comprising:
an acceptance unit that accepts designation of an identification information file containing data of one or a plurality of pieces of identification information; and
an extraction unit that receives the identification information file on the basis of the designation accepted by said acceptance unit, and extracts the identification information by analyzing the file.

6. The apparatus according to claim 1, further comprising a second determination unit that determines whether or not a plurality of pieces of identical identification information are input to the second input areas, wherein said license information issuing unit does not issue license information when said second determination unit determines that a plurality of pieces of identical identification information are input.

7. The apparatus according to claim 1, further comprising a second determination unit that determines whether or not a plurality of pieces of identical identification information are input to the second input areas, wherein if said second determination unit determines that a plurality of pieces of identical identification information are input, said license information issuing unit issues license information only with respect to identification information which are determined as not being identical.

8. The apparatus according to claim 1, further comprising:
a second storage unit that stores the identification information of an apparatus which has been permitted to install the software in the past in correspondence with the software, and
a second determination unit that determines whether the identification information input to one of the second input areas is stored in said second storage unit as that of an apparatus which has been permitted to install the software in the past, wherein when said second determination unit determines that the identification information input to the one of the second input areas is stored in said second storage unit as that of an apparatus which has been permitted to install the software in the past, said license information issuing unit does not issue license information for the apparatus which has been permitted to install the software in the past.

9. The apparatus according to claim 1, further comprising:
a second storage unit that stores identification information of an apparatus which has been permitted to install the software in the past in correspondence with the software, and
a second determination unit that determines whether the identification information input to one of the second input areas is stored in said second storage unit as that of an apparatus which has been permitted to install the software in the past, wherein when said second determination unit determines that the identification information input to the one of the second input areas is stored in said second storage unit as that of an apparatus which has been permitted to install the software in the past, said license information issuing unit issues license information with respect to identification information to apparatuses other than the one with the identification information stored in said second storage unit as that of an apparatus which has been permitted to install the software in the past.

10. An information processing method for a license information issuing server for issuing license information to a user terminal for permitting installation of software in apparatuses that communicate with the user terminal, comprising:

a storage step of storing, in a storage unit, in association with license access information corresponding to a software, a license count number designating a limit of the number of apparatuses in which the software is permitted to be installed;

a first transmission step of, upon receiving an access request via a network from the user terminal for license information, transmitting to the user terminal first display data for displaying on a display unit of the user terminal a first input area for the user to license access information of a software to be installed;

a first reception step of receiving license access information input by the user in the first input area of the first display data;

a determination step of, upon receiving from the user terminal the license access information input by the user in the first input area, determining, based on the license count number designating the limit of the number of the apparatuses in which the software associated with the received license access information can be installed, a number of second input areas for a user to input identification information identifying each of the apparatuses in which the software is to be installed;

a second transmission step of transmitting, to the user terminal, second display data for displaying on the display unit of the user terminal the determined number of second input areas for the user to input the identification information of the apparatuses in which the software is to be installed;

a second reception step of receiving from the user terminal a plurality of pieces of identification information of the apparatuses input by the user to the second input areas of the second display data; and a license information issuing step of issuing license information to the user terminal for permitting installation of the software to each of the apparatuses corresponding to the plurality of pieces of identification information received in the second reception step.

11. The method according to claim 10, further comprising a derivation step of deriving, based on the license count number and additional information, a number of the apparatuses which are currently permitted to install the software in accordance with the access information, wherein the second display data for displaying the second input areas includes a plurality of second input areas equal in number to the number derived by said derivation step.

12. The method according to claim 10, further comprising a second determination step of determining whether or not a plurality of pieces of identical identification information are input to the second input areas, wherein the license information is not issued when the second determination step determines that a plurality of pieces of identical information are input.

13. The method according to claim 10, further comprising a second determination step of determining whether or not a plurality of pieces of identical identification information are input to the second input areas, wherein, when the second determination step determines that a plurality of pieces of identical information are input, the license information is issued only with respect to those apparatuses for which the identification information is not identical.

14. The method according to claim 10, further comprising:

a second storage step of storing in a second storage unit the identification information of an apparatus which has been permitted to install the software in the past in accordance with the software; and a second determination step of determining whether the identification information input to one of the second input areas is stored in the second storage unit as that of an apparatus which has been permitted to install the software in the past, wherein when the second determination step determines that the identification information input in the one of the plurality of second input areas is stored in the second storage unit, the license information is not issued in the license issuing step the apparatus which has been permitted to install the software in the past.

15. The method according to claim 10, further comprising:

a second storage step of storing in a second storage unit the identification information of an apparatus which has been permitted to install the software in the past in accordance with the software; and a second determination step of determining whether the identification information input to one of the second input areas is stored in the second storage unit as that of an apparatus which has been permitted to install the software in the past, wherein when the second determination step determines that the identification information input in the one of the second input areas is stored in the second storage unit, the license information is issued in the license issuing step with respect to identification information to apparatuses other than the one with the identification information stored in said second storage unit as that of an apparatus which has been permitted to install the software in the past.

16. A computer readable storage medium on which is stored a program for causing a license information issuing server to execute a method for issuing license information to a user terminal for permitting installation of software in apparatuses that communicate with the user terminal, the method comprising:

a storage step of storing, in a storage unit, associated with license access information corresponding to a software, a license count number designating a limit of the number of apparatuses in which the software is permitted to be installed;

a first transmission step of, upon receiving an access request via a network from the user terminal for license information, transmitting to the user terminal first display data for displaying on a display unit of the user terminal a first input area for the user to input license access information of a software to be installed;

a first reception step of receiving license access information input by the user in the first input area of the first display data;

a determination step of, upon receiving from the user terminal the license access information input by the user in the first input area, determining, based on the license count number designating the limit of the number of the apparatuses in which the software associated with the received license access information can be installed, a number of second input areas for the user to input identification information identifying each of the apparatuses in which the software is to be installed;

a second transmission step of transmitting, to the user terminal, second display data for displaying on the display unit of the user terminal the determined number of second input areas for the user to input the identification information of the apparatuses in which the software is to be installed;

a second reception step of receiving from the user terminal a plurality of pieces of identification information of the apparatuses input by the user to the second input areas of the second display data; and a license information issuing step of issuing license information to the user terminal for permitting installation of the software to each of the apparatuses corresponding to the plurality of pieces of identification information received in the second reception step.

17. The computer readable storage medium according to claim 16, further comprising a derivation step of deriving, based on the license count number and additional information, a number of the apparatuses which are permitted to install the software in accordance with the access information, wherein the second display data for displaying the second input areas includes a plurality of second input areas equal in number to the number derived by said derivation step.

18. The computer readable storage medium according to claim 16, further comprising a second determination step of determining whether or not a plurality of pieces of identical identification information are input to the second input areas, wherein the license information is not issued when the second determination step determines that a plurality of pieces of identical information are input.

19. The computer readable storage medium according to claim 16, further comprising a second determination step of determining whether or not a plurality of pieces of identical identification information are input to the second input areas,
wherein, when the second determination step determines that a plurality of pieces of identical information are input, the license information is issued with respect to those apparatuses for which the identification information is not identical.

20. The computer readable storage medium according to claim 16, further comprising:
a second storage step of storing in a second storage unit the identification information of an apparatus which has been permitted to install the software in the past in accordance with the software; and
a second determination step of determining whether the identification information input to one of the second input areas is stored in the second storage unit as that of an apparatus which has been permitted to install the software in the past,
wherein when the second determination step determines that the identification information input in the one of the second input areas is stored in the second storage unit, the license information is not issued in the license issuing step for the apparatus which has been permitted to install the software in the past.

21. The computer readable storage medium according to claim 16, further comprising:
a second storage step of storing in a second storage unit the identification information of an apparatus which has been permitted to install the software in the past in accordance with the software; and
a second determination step of determining whether the identification information input to one of the second input areas is stored in the second storage unit as that of an apparatus which has been permitted to install the software in the past,
wherein when the second determination step determines that the identification information input in the one of the second input areas is stored in the second storage unit, the license information is issued in the license issuing step with respect to identification information to apparatuses other than the one with the identification information stored in said second storage unit as that of an apparatus which has been permitted to install the software in the past.

* * * * *